July 28, 1964  A. SHOHAM  3,142,245
SAFETY MEANS FOR VENTILATED CLOSED CHAMBERS
Filed Oct. 3, 1961  2 Sheets-Sheet 1
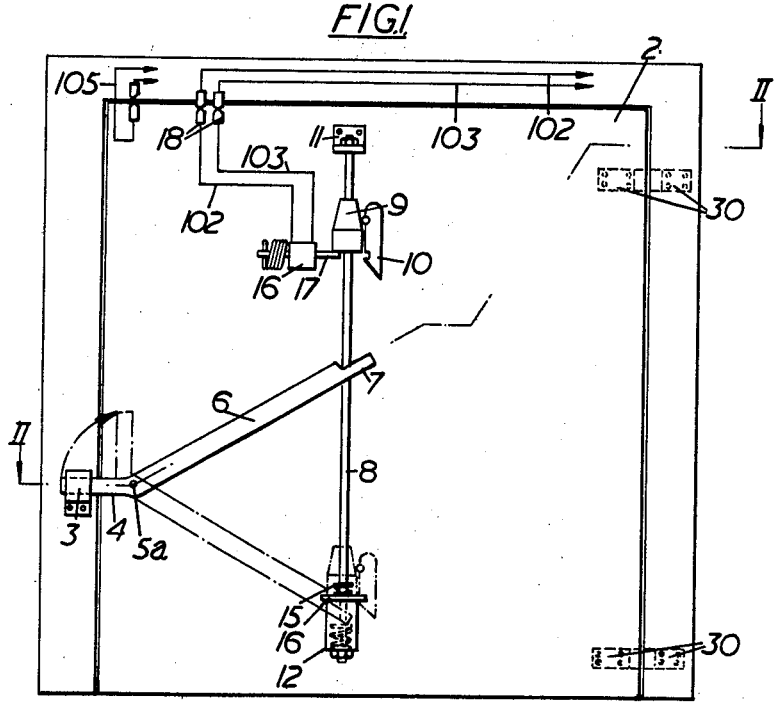
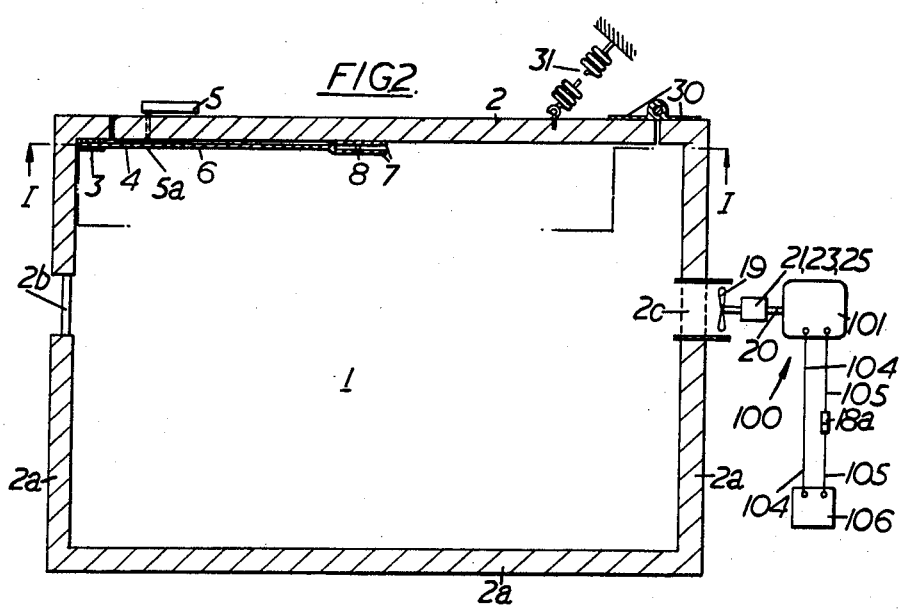
Inventor
ABRAHAM SHOHAM
By Mulglew and Toren
Attorneys July 28, 1964   A. SHOHAM   3,142,245
SAFETY MEANS FOR VENTILATED CLOSED CHAMBERS.
Filed Oct. 3, 1961   2 Sheets-Sheet 2
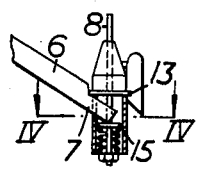
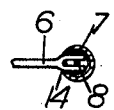
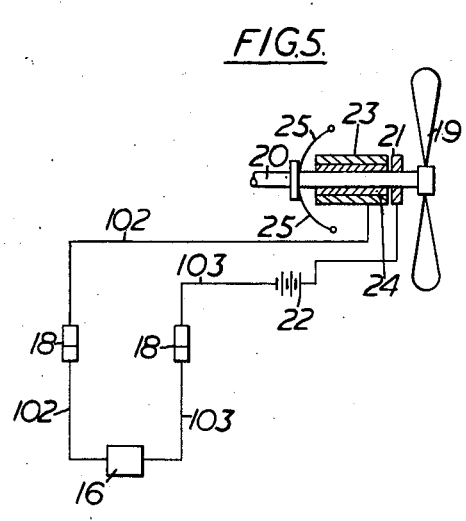
Inventor
ABRAHAM SHOHAM
By McGlew and Toren
Attorneys

United States Patent Office 3,142,245
Patented July 28, 1964

3,142,245
SAFETY MEANS FOR VENTILATED CLOSED
CHAMBERS
Abraham Shoham, Ein-Hachoresh, Israel, assignor to
Ein-Hachoresh Kibbutz Hashomer Hazair Lehityashvut
Shitufit B.M., Ein-Hachoresh, Israel
Filed Oct. 3, 1961, Ser. No. 142,645
Claims priority, application Israel Oct. 12, 1960
4 Claims. (Cl. 98—43)

The present invention concerns chambers of the kind wherein a desired gas is continuously consumed in exchange for an undesired one and the chamber is accordingly continuously ventilated by ventilation means, e.g. a fan, adapted to suck the desired gas into the chamber and to expel the undesired gas therefrom. An example of such a chamber is the hatching chamber of an incubator, i.e. the chamber wherein the chickens creep out from the eggs. Hereinafter the invention will be described with reference to such a hatching chamber of an incubator, it being well understood that the invention is not confined to such a particular kind of chamber and is equally well applicable to any other chamber in which a desired atmosphere is to be maintained as specified above.

The hatching chamber of an incubator is, as a rule, isolated from the remainder of the incubator. The creeping out of chickens from the eggs usually takes about two to three days during which the chickens are already fully alive which means that oxygen is consumed while carbon dioxide is produced. The eggs are as a rule very densely packed in the chamber and unless a continuous air circulation is maintained, i.e. fresh air is taken in from the surrounding atmosphere while the spent air is expelled from the chamber, the chickens would die within a short period, e.g. 15 minutes. Such a continuous air circulation is usually maintained by at least one fan.

It sometimes happens that the fan fails. This may be due for example, to a failure of the driving motor of the fan, or to failure of the electricity where the fan is driven by an electrical motor, or to a breakdown of the power transmission means. Whatever the reason may be, the failure of the fan means that, unless something is done for providing alternative ventilating means, the chickens inside the chamber will die. For this reason, the manufacturers of incubators usually provide an acoustic alarm which is supposed to operate automatically whenever the fan stops. When such an alarm is given, an attendant has to open the door of the chamber in order to enable the admittance of fresh air and to discharge the spent air while the defect is repaired. This arrangement has, however, certain drawbacks. In the first place it has turned out that acoustic alarm systems are not very reliable and are liable to fail at a critical moment. Moreover, even when the system functions, it is not always possible, for example at night, for the attendant to reach the incubator in time so as to open the door of the hatching chamber before the chickens suffocate.

For these reasons it is an object of the present invention to provide chambers of the kind specified with an automatic arrangement by which the chamber is opened into communication with the surrounding space whenever the fan fails.

The invention is embodied in a chamber of the kind wherein a desired gas is continuously consumed in exchange for an undesired one, said chamber comprising a body, ventilation means adapted to suck the desired gas into the chamber and to expel gas therefrom, an opening in said body, a swingable cover adapted to seal tightly said opening and being biassed into the open position, a bolt pivotally mounted on said cover adapted for actuation from outside the chamber, locking means on the body for co-operation with the bolt in the sealed position of the cover, an arm keyed on the pivot of said bolt at the inner side of said cover, a guide member inside the chamber in a position other than horizontal, a weight slidable on said guide member adapted, upon sliding downwards, to abut said arm when the bolt is locked thereby to unlock it, an electrically controlled detent adapted to arrest said weight in a lifted position clear of said arm and to release the weight upon receipt of an electric impulse, means for producing an electric impulse whenever said ventilating means stop from operating, and means for feeding said impulse to said detent.

If the bolt is located inside the chamber it is preferably integral with said arm and is either aligned with the latter or forms with it an obtuse angle.

When the ventilating means stop from operating, said weight is released and allowed to drop along its vertical guide member. During its fall it hits the arm whereupon the bolt is swung about its pivot and unlocked. Owing to the fact that the door is biased, it opens spontaneously whenever it is unbolted and in this manner the interior of the chamber is immediately put into communication with the surrounding space.

If desired, the arrangement according to the invention may be combined with an acoustic alarm signal as known per se. In this case the electrical circuits of the detent and the alarm will be in parallel.

The cover may be in the form of a door, lid, flap or the like. It is conceivable and within the scope of the present invention that the above opening in the body be identical with the one serving for charging and discharging the chamber when it is in the inoperative state.

According to a preferred embodiment of the invention the weight comprises a catch adapted for co-operation with a stationary member of the chamber in such a manner as to arrest the weight in its lowermost position. In this manner the arm keyed on the pivot of the bolt cannot be displayed from the position it assumes when the cover is unbolted by the action of the downfalling weight so that the cover cannot be bolted as long as the weight is not released and lifted into its starting position. This arrangement assures that the chamber is not reset into operation without first resetting the safety means according to the invention.

The invention is illustrated, by way of example only, in the accompanying drawings in which:

FIG. 1 is an elevation of the door of a hatching chamber of an incubator according to the invention, as seen from within the incubator chamber as viewed along the section line I—I of FIG. 2;

FIG. 2 is a section along the line II—II of FIG. 1;

FIG. 3 shows a detail of the arrangement according to FIG. 1;

FIG. 4 is a section along line IV—IV of FIG. 3; and

FIG. 5 shows the means provided on the fan for producing an electric impulse whenever the fan stops.

As shown in FIGS. 1 and 2, a chamber 1 is defined by three walls 2a, a door 2 and a roof (not illustrated). The door 2 has hinges 30, which are biased by a spring 31 (shown diagrammatically) in such a manner that whenever the door 2 becomes unbolted, it opens spontaneously. As shown at FIG. 2, one wall 2a includes a louver 2b, which may have a filter combined therewith; the louver 2b and the wall 2a defining an air intake passage into the chamber 1. In an opposite wall 2a, there is defined a passage 2c, which serves to enable carbon dioxide and air to be exhausted from within the chamber 1. An exhaust fan, designated generally by the reference 100, is provided and arranged with respect to the exhaust passage 2c so that the rotating fan blades 19 serve to exhaust the chamber 1. As shown at FIGS. 1 and 2, mounted on the inside of one of the incubator's walls, there is provided an upright angle piece 3 adapted for co-operation with a bolt 4. The bolt 4 comprises a handle 5 outside the door and an arm 6 inside the door having a bifurcated end portion 7. At the juncture between the bolt 4 and the arm 6 there is provided a pivot 5a which is rigidly fixed at its ends to an end of the handle 5 and the juncture between the bolt 4 and the arm 6. A suitable hole through the door 2 is provided for receiving the protruding pivot 5a. A suitable seal may be provided in the hole in the door 2 to enable rotation of the pivot 5a by manually turning the handle 5 and at the same time maintaining a good seal between the air in chamber 1 and the outside air. With respect to the pivot 5a the bolt portion 4 is designed to have a greater counter-clockwise (with respect to the orientation illustrated at FIG. 1) turning moment than the clockwise turning moments of the handle 5 and the arm 6. Accordingly, when the handle 5 is turned so that it is in the position shown at FIG. 2, the bolt 4 will remain at rest within the upright angle piece 3 and the arm 5 will be in the attitude shown at FIG. 1; i.e., by merely turning the handle 5, the bolt 4 will due to its counter-clockwise turning moment maintain arm 6 in the position shown. For example, the bolt portion 4 may be suitably weighted to give it the appropriate turning moment. As another example, a biasing spring (not shown) may be employed on the inside of the door 2 and having an end thereof connected with the door 2 and another end thereof connected with the arm 6 to normally bias the arm 6 to the position indicated at FIG. 1.

Slidably mounted on a vertical rod 8 is a weight 9 provided with a recessed catch member 10 pivotally connected thereto. The upper end of rod 8 is anchored in a bracket 11 connected to the inside of the door while the lower end of the rod 8 is anchored in a cup-shaped member 12 also connected to the door. The cup-shaped member 12 comprises a flange 13, a slot 14 and a spring-biased plunger 15.

Near the upper end of the rod 8 there is provided a solenoid 16 whose core 17 is normally in the extracted position illustrated in FIG. 1 and thus serves as a detent preventing the weight 9 from falling.

As shown at FIGS. 1 and 5, two wires 102 and 103 extend from the two terminals of the solenoid 16 through a pair of sliding contacts 18 to the control circuit arrangement (FIG. 5), which will deliver an electric impulse through the serially connected contacts 18 to the solenoid 16 whenever the shaft 20 of the fan 100 stops rotating.

A circuitry for producing an electric impulse whenever the fan stops is illustrated in FIG. 5. As shown, the fan blade 19 is keyed on a shaft 20 which may be linked by any conventional transmission means to a driving motor 101. Also keyed on shaft 20 is a metal plate 21 connected to one pole of a D.C. source 22. A metal sleeve 23 is also keyed on shaft 20 and insulated therefrom by means of an insulating sleeve 24. Also, two spring-loaded electrical contacts 25 are keyed on shaft 20. When shaft 20 revolves, the contacts 25 are forced away from the sleeve 23 by centrifugal force. At the moment when the shaft 20 stops revolving, the spring-loaded contacts 25 are drawn towards sleeve 23 and come in contact with it as shown by way of dashed lines in FIG. 5. In this position the circuit elements 22, 21, 20, 25, 23, 18 and 16 are electrically connected through the wires 102 and 103.

The operation of the arrangement according to the invention is as follows:

Whenever an electric impulse is produced owing to non-rotation of fan shaft 20, the solenoid 16 is energized and its core 17 retracted. As a result of this weight 9 is released and falls downwardly. On its way down on rod 8 it hits the bifurcated end portion 7 of arm 6 and forces it downwardly. As a result, bolt 4 is unbolted. On its way down end portion 7 reaches plunger 15, which, in turn, serves as shock absorber and penetrates inside cup member 12 which is possible owing to the presence of slot 14 (see FIGS. 3 and 4). At the same time weight 9 comes to bear on the upper rim of the cup-shaped member 12 while catch member 10 is guided into engagement with flange 13. Owing to the unbolting of bolt 4, door 2 is opened by the biasing action of the spring 31.

Since in the unbolted position the bifurcated end portion 7 of arm 6 is disposed below weight 9, the door cannot be rebolted without first lifting the weight. This however becomes impossible as long as member 10 is engaged by flange 13. Thus, in order to rebolt the door it is first necessary to manually disengage the catch 10 and lift the weight 9 back into its uppermost position. If the catch member 10 were not present it would be possible to bolt the door without first lifting the weight 9. The weight 9 could be lifted by arm 6 but not as far upwardly as its uppermost position and accordingly the arrangement would not be reset and would, therefore, not be able to function properly anymore. Thus, it would be possible to close the door inadvertently without first resetting the automatic safety arrangement according to the invention.

Owing to the presence of the sliding contacts 18 the solenoid 16 is de-activated the moment the door 2 has opened. In this manner the solenoid is only activated for very short durations and, as a result, will have a practically unlimited lifetime.

If desired, according to another embodiment of the invention, the driving motor of the fan may also be connected to its source of current 106 via the sliding contacts 18a coupled with the door 2 in such a manner that the motor cannot operate unless the door is closed. See, for example, FIG. 2. This kind of arrangement is advantageous since it may happen that the current supply fails for a short time and would, by re-appearing, start the fan motor which would cause an excessive ventilation in the open state of the chamber. As illustrated at FIG. 2, the additional sliding contacts 18a are connected in series with the wire 105; the wires 104 and 105 connecting the fan motor 101 with a separate current source 106 for operating the fan motor.

As pointed out before, the safety arrangement according to the invention may be coupled with a conventional acoustical alarm signal which is known per se and need not be described.

I claim:

1. In combination: enclosure means having a chamber defined therein and first, second and third openings defined through said enclosure means, said first opening enabling gaseous media outside said enclosure means to pass into said chamber; an exhaust fan, including a rotatable shaft, operable for exhausting gaseous media through the second opening from said chamber; a motor operable for rotating said shaft and operating said exhaust fan; a cover adapted for closing the third opening and thereby preventing access into the chamber; hinge means for swinging said cover about one of its edges to permit or prevent access into the chamber through the third opening; means for biasing said cover to a position so that the third opening is unclosed thereby permitting access into the chamber; a bolt, fixed to a pivot protruding through said cover, adapted for actuation from outside of said enclosure means, said bolt having an arm extending therefrom; an upwardly open angle piece for receiving said bolt when said cover is closing the third opening; a guide member upwardly extending along said cover; a weight, slidable along said guide member, adapted, upon sliding downwardly, to abut said arm when said bolt is received by said angle piece thereby rotatively moving said pivoted bolt out of reception by said angle piece to cause said biasing means to move said cover to the position where the third opening is unclosed; electrically controlled detent means adapted to arrest said weight when said weight is slid upwardly along said guide member to a position clear of said arm, said detent means being operable in response to an electrical signal to release the arrested weight thereby enabling said weight to slide downwardly, by gravity, along said guide member; means for producing an electrical signal to operate said detent means in response to the non-rotation of said shaft of said exhaust fan.

2. The combination, defined by claim 1, wherein said bolt and extending arm are integral with each other and are situated inside said chamber when said cover closes the third opening.

3. The combination, defined by claim 1, wherein said guide member includes a flange at a lowermost part thereof and said weight includes a catch member adapted to engage said flange to arrest the weight when it has slid to said lowermost part of said guide member.

4. The combination, defined by claim 1, wherein said means for producing an electrical signal includes sliding switch contact means arranged with said cover so that upon the opening of said cover said electrical signal producing means is disconnected from said detent means.

References Cited in the file of this patent

UNITED STATES PATENTS

| | | |
|---|---|---|
| 762,770 | Stewart | June 14, 1904 |
| 1,764,704 | Teare | June 17, 1930 |
| 1,830,273 | Hill | Nov. 3, 1931 |
| 2,040,544 | Brandt | May 12, 1936 |
| 2,751,838 | Jones | June 26, 1956 |